(12) United States Patent
Wood et al.

(10) Patent No.: US 6,682,100 B2
(45) Date of Patent: Jan. 27, 2004

(54) CONNECTION BLOCK WITH CLIP

(75) Inventors: Shawn C. Wood, Collierville, TN (US); Kirk E. Eschenburg, Troy, MI (US)

(73) Assignee: Parker-Hannifin Corporation, Cleveland, OH (US)

( * ) Notice: Subject to any disclaimer, the term of this patent is extended or adjusted under 35 U.S.C. 154(b) by 161 days.

(21) Appl. No.: 10/010,217

(22) Filed: Dec. 7, 2001

(65) Prior Publication Data

US 2002/0117850 A1 Aug. 29, 2002

Related U.S. Application Data

(60) Provisional application No. 60/269,142, filed on Feb. 15, 2001.

(51) Int. Cl.$^7$ ................................................ F16L 35/00
(52) U.S. Cl. .................... 285/26; 285/305; 285/124.3; 248/56; 248/74.1
(58) Field of Search ...................... 285/26, 29, 124.1, 285/124.2, 124.3, 124.4, FOR 118, 305; 248/56, 74.1

(56) References Cited

U.S. PATENT DOCUMENTS

| 706,974 A | 8/1902 | Lyle |
| 1,069,937 A | 8/1913 | Goehst et al. |
| 2,458,670 A | * 1/1949 | Young, Jr. ............. 248/56 |
| 2,577,120 A | 12/1951 | Franz |
| 3,142,358 A | 7/1964 | Woerheide, Jr. |
| 3,374,014 A | 3/1968 | Kull et al. |
| 3,572,778 A | 3/1971 | Cassel |
| 3,869,152 A | 3/1975 | DeVincent et al. |
| 3,869,153 A | 3/1975 | DeVincent et al. |
| 3,929,356 A | 12/1975 | DeVincent et al. |
| 4,002,822 A | * 1/1977 | Kurosaki ............. 174/153 G |
| 4,400,992 A | 8/1983 | Londres |
| 4,468,054 A | 8/1984 | Orth |

(List continued on next page.)

FOREIGN PATENT DOCUMENTS

JP 6-185673 * 7/1994 .............. 285/124.1

OTHER PUBLICATIONS

Gra-Tec catalog, Apr. 10, 1968.*

Primary Examiner—Lynne H. Browne
Assistant Examiner—James M. Hewitt
(74) Attorney, Agent, or Firm—Christopher H. Hunter

(57) ABSTRACT

A mounting device for mounting a tube to a refrigeration system component includes a connecting block and a clip, where the clip is inserted into a U-shaped recess in the block essentially perpendicular to the axis of the connecting block. The connecting block includes a body having end surfaces extending perpendicular to the axis of the body, and a U-shaped recess axially interconnecting the surfaces and opening outwardly from a side of the body for receipt of the tube. A U-shaped channel in the recess faces outwardly from the recess. The clip has a U-shaped body, and a pair of resilient tabs extend outwardly from the body in parallel relation to one another. The tabs of the clip are closely received in opposite sides of the U-shaped channel and the channel can be coined to retain the clip within the body. The tabs are bent inwardly toward one another by the curved inner end of the channel to facilitate retaining the clip within the channel. The clip and tube also include cooperating geometries to rotationally orient and axially locate the tube within the connecting block. The sides of the extension fit tightly within the opening of the U-shaped recess to retain the clip within the connecting block.

31 Claims, 4 Drawing Sheets

U.S. PATENT DOCUMENTS

| | | | |
|---|---|---|---|
| 4,619,545 A | | 10/1986 | Kittenbaum |
| 4,635,974 A | * | 1/1987 | Moussaian .................. 285/305 |
| 4,759,462 A | | 7/1988 | Neglio |
| 4,826,114 A | | 5/1989 | Umehara |
| 5,040,831 A | * | 8/1991 | Lewis ........................ 285/305 |
| 5,078,432 A | | 1/1992 | Seiter |
| 5,169,178 A | * | 12/1992 | Hunzinger ................... 285/26 |
| 5,217,190 A | * | 6/1993 | Reed et al. ................ 248/27.3 |
| 5,219,185 A | | 6/1993 | Oddenino |
| 5,234,185 A | | 8/1993 | Hoffman et al. |
| 5,271,646 A | | 12/1993 | Allread et al. |
| 5,370,344 A | | 12/1994 | Nadherny |
| 5,380,326 A | | 1/1995 | Lin |
| 5,387,014 A | * | 2/1995 | Chevallier ................... 285/26 |
| 5,405,175 A | * | 4/1995 | Bonnah et al. ............. 285/305 |
| 5,464,256 A | * | 11/1995 | Godeau ...................... 285/26 |
| 5,507,529 A | * | 4/1996 | Martins ....................... 285/26 |
| 5,593,187 A | * | 1/1997 | Okuda et al. ............... 285/305 |
| 5,675,128 A | * | 10/1997 | Simon .................... 174/152 G |
| 5,860,677 A | * | 1/1999 | Martins et al. ............... 285/26 |
| 5,860,681 A | | 1/1999 | Slais |
| 5,964,483 A | | 10/1999 | Long et al. |
| 6,105,216 A | * | 8/2000 | Opperthauser ............... 24/459 |
| 6,142,428 A | * | 11/2000 | Kamata et al. ............ 248/68.1 |
| 6,318,765 B1 | * | 11/2001 | Slais et al. .................. 285/305 |
| 6,382,678 B1 | * | 5/2002 | Field et al. ..................... 285/3 |

* cited by examiner

CONNECTION BLOCK WITH CLIP

CROSS-REFERENCE TO RELATED CASES

The present application claims the benefit of the filing date of U.S. Provisional Application Ser. No. 60/269,142; filed Feb. 15, 2001.

BACKGROUND OF THE INVENTION

The present invention relates generally to a device for connecting a tube to a port in a housing. The present invention is particularly useful to connect a tube of an air conditioning circuit to a port associated with a component, such as an expansion device or compressor of the type generally used in automotive vehicle air-conditioning systems.

Many different types of tube mounting devices are known for attaching a tube to a component of an air conditioning system. A flexible refrigerant hose in an air conditioning system is typically provided with a rigid tube end fitting. The tube end fitting is then inserted into the port in the appropriate air conditioning component and attached to the air conditioning component using the mounting device. Many of such mounting devices include a connecting block with one (or more) openings extending through the block for receipt of one (or more) tubes. The tube(s) are received in the openings in the block and retained therein using different techniques, depending for the most part on the manufacturer. A bore extending through the block allows the connecting block to be easily fastened to an outer surface of the component with a fastener (e.g., a bolt), such that the tube is sealingly connected to the component. The connecting block facilitates the attachment of the tube(s) to the component in a simple and cost-effective manner, and is widely used in the industry.

U.S. Pat. No. 5,860,681 for example, shows a connecting block with a U-shaped recess interconnecting opposite end surfaces of the block along an axis, and opening outwardly from the side of the block, where a tube is inserted into the recess from the side of the block such that the longitudinal axis of the tube is located along the axis of the connecting block. An insert (clip) is then inserted into the recess to capture the tube by axially sliding the insert from one end surface of the block. The insert includes winged tabs extending axially along opposite sides of the insert which are received with a press-fit within corresponding axial slots in the recess, and a concave surface which corresponds to and is located against the diameter of the tube. While such a mounting device might be appropriate for particular applications, it is believed the insert can be difficult to slide into the recess from one end surface of the block. The insert also must typically pass over an annular bead or flange on the end of the tube as it is being pushed into the slot, which can make it difficult to push the insert fully into place and lock the tube in the block. It can also sometimes be difficult to access the end surface of the block to push the insert into the block.

Other techniques, for example as shown in U.S. Pat. No. 5,405,175, have clips with a complicated geometry which can be difficult and costly to manufacture. The clip shown in the '175 reference includes a base, a fork projecting outwardly from the base, a pair of outwardly-opening channels on each side of the fork, and a catch located in each channel to grab notches formed in the enlarged receiving end of a tube.

Other techniques, such as shown in U.S. Pat. Nos. 4,635,974, 5,040,831 and 5,593,187, require the clip to have a spring function to hold the tube in the block. Should the clip lose its spring characteristic, the clip can fall out of the block and allow unintentional release of the tube from the block and/or components.

It is believed other techniques rely on system pressure to ensure rigid attachment of the clip to the connecting block. This can also be an unreliable technique for attaching the tube to the component in the event of fluctuations in system pressure.

Still other techniques do not allow selective control of the amount of rotation of the tube in the block during attachment. Such control can be useful or even necessary in some attachment applications.

As such, it is believed there is a demand for an improved mounting device for a tube, which allows selective control of the rotation of the tube captured in the block; is simple in construction and assembly, and relatively inexpensive to manufacture; and does not rely on a spring function or system pressure to maintain the attachment of the tube.

SUMMARY OF THE PRESENT INVENTION

According to the present invention, the mounting device includes a connecting block and a clip, where the clip is inserted into a U-shaped recess in the block essentially perpendicular to the axis of the connecting block. The connecting block includes an elongated body having first and second parallel end surfaces extending perpendicular to the axis of the body, a circular opening axially interconnecting the surfaces toward one side of the body for receipt of a first tube; a circular opening axially interconnecting the surfaces in the central portion of the body for receipt of an attachment device (such as a threaded bolt); and a U-shaped recess axially interconnecting the surfaces toward another side of the body for receipt of a second of the tubes. The U-shaped recess opens outwardly from the side of the body and includes a U-shaped channel formed in the recess perpendicular to the axis and facing outwardly from the recess.

The clip has a U-shaped body, and a pair of resilient tabs extend outwardly from the body in parallel relation to one another. The tabs are closely received, preferably with a slip-fit, in opposite sides of the U-shaped channel. The tabs have a length such that when the clip is inserted into the U-shaped channel, the tabs are bent inwardly toward one another by the curved inner end of the channel to facilitate retaining the clip within the channel. The body also includes a flat, outwardly-projecting flange perpendicular to the tabs and facing the U-shaped channel. The flange is received within a notch or groove in the tube to rotationally orient the tube properly within the connecting block. The outer ends of the channel are then coined to retain the tabs, and hence the clip, within the body.

The clip further includes an extension projecting axially from the body of the clip. The extension includes a concave curved portion facing the U-shaped channel when the clip is inserted in the channel. The distal edge of the extension is located against a bead on the tube when the clip is inserted into the channel to axially fix the tube with respect to the connecting block. The sides of the extension fit tightly within the open mouth of the recess to retain the clip within the connecting block before the channels are coined.

It is a further aspect of the present invention that the connecting block could have two (or more) U-shaped recesses for retaining multiple tubes. In this case, the recesses could each have the same structure as described above, and an appropriate number of clips could be provided to retain the tubes within the respective recesses during assembly of the block with the air conditioning system component.

Further features and advantages of the present invention will become apparent from reviewing the following description and accompanying drawings.

DETAILED DESCRIPTION OF THE PREFERRED EMBODIMENT

Figure 1:
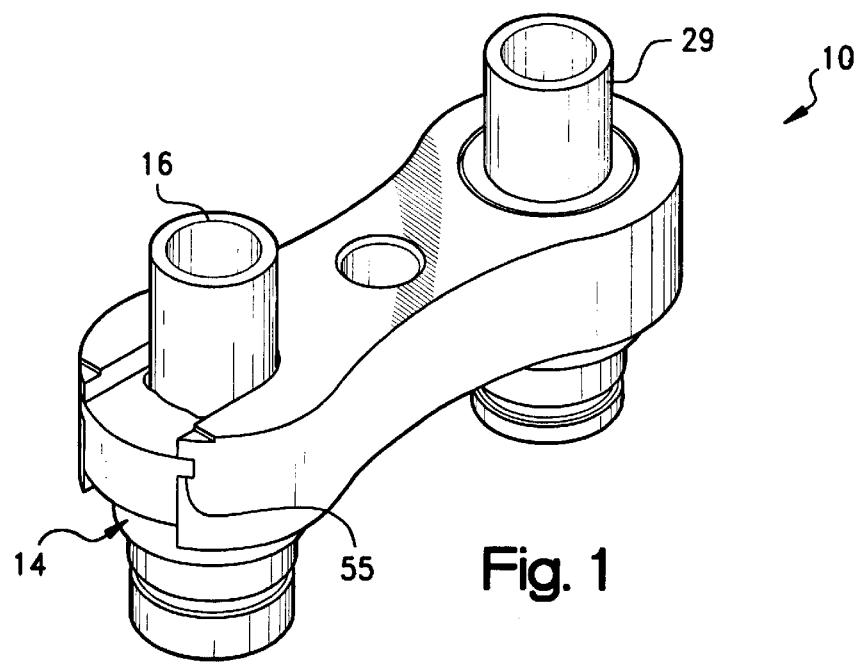
FIG. 1 is an elevated perspective view of the mounting device constructed according to the principles of the present invention.

Referring to the drawings, and initially to FIG. 1, a mounting device constructed according to the present invention is indicated generally at 10. The mounting device includes a connecting block, indicated generally at 12, and a clip, indicated generally at 14, which retain a first tube 16 for attachment to a component of an air conditioning system (not shown).

Figure 2:
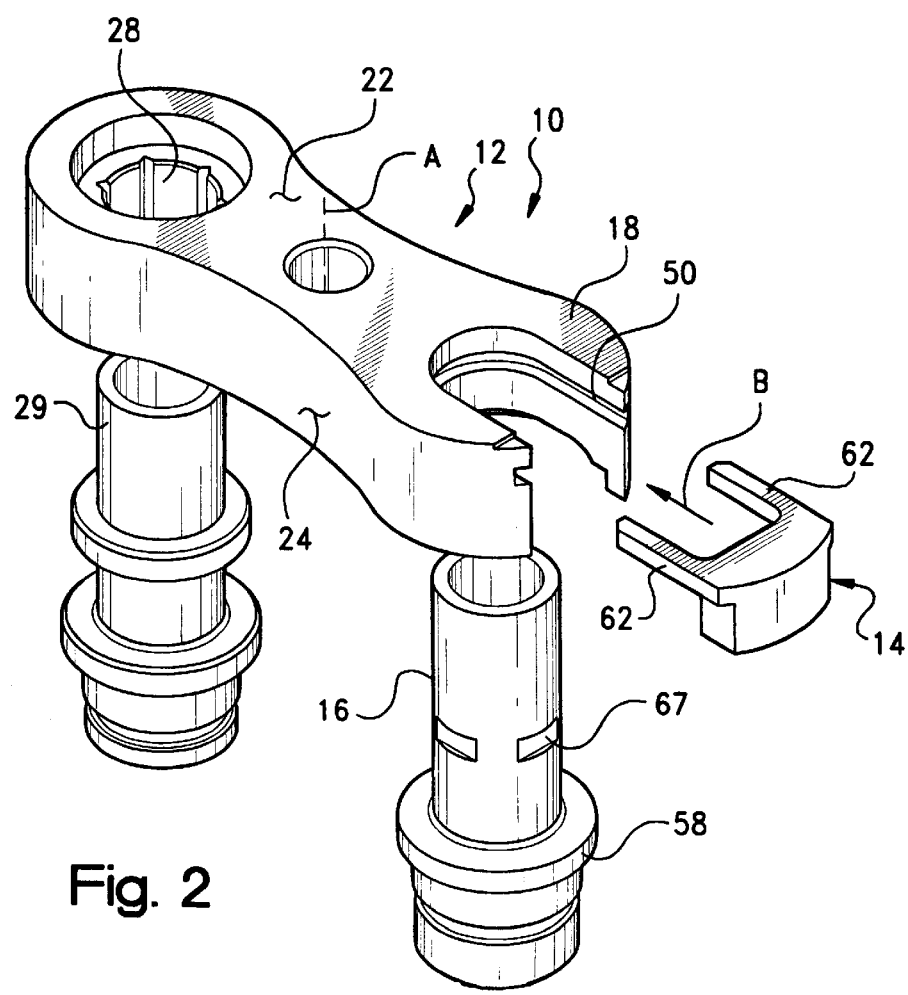
FIG. 2 is an exploded view of the mounting device of FIG. 1.
Figure 4:
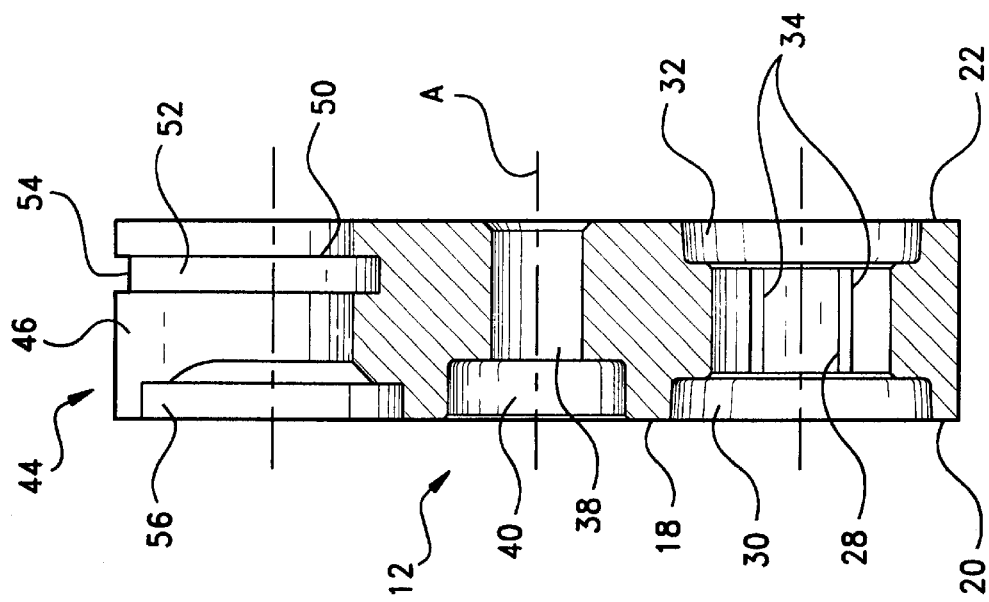
FIG. 4 is a cross-sectional side view of the connecting block taken substantially along the plane described by the lines 4—4 in FIG. 3.
Figure 3:
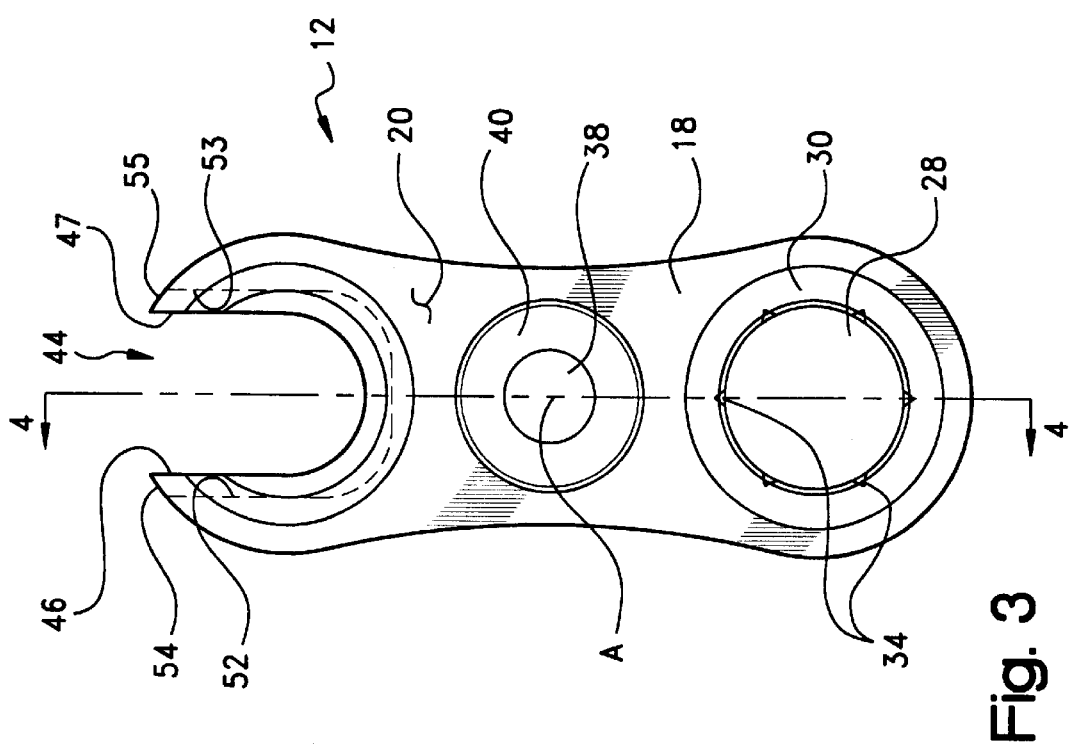
FIG. 3 is a top plan view of the connecting block for the mounting device.

Referring now to FIGS. 2–4, the connecting block 12 includes a body 18 having an elongated shape with a first end surface 20 and a second end surface 22. The end surfaces 20 and 22 are preferably flat and extend parallel to one another, perpendicular to an axis "A" of the body. A side surface 24 extends around the periphery of the body. The body is illustrated as having essentially an "hourglass" configuration, although other configurations are possible.

The connecting block 12 further includes a first circular bore 28 toward one side of the body extending axially through the body from one side surface to the other. A second tube 29 is typically inserted into bore 28 at a remote location, retained in a conventional manner (e.g., coining, crimping, brazing, etc.) and the subassembly is then transported to an end location to be assembled with a refrigeration system component. A counterbore 30 can be formed into bore 28 at the first surface, while a second counterbore 32 can be formed into bore 28 at the second surface. Striations (thin channels) as at 34 can be formed axially along the bore. Counterbores 30, 32 and striations 34 facilitate locking tube 29 to block 12. The use of such a technique to attach a tube to a connecting block is known in the art, and further description is believed unnecessary.

A second bore 38 is formed centrally in the body and extends axially through the body from one end surface to the other. Second bore 38 is designed to receive a fastener, such as a threaded bolt (not shown), to attach the body 18 to a surface of the refrigeration system component. The fastener is inserted through bore 38 such that surface 22 of body 18 is preferably mounted in flush, surface-to-surface relation with the cooperating surface of the component. A counterbore 40 can be formed into bore 38 at one end surface if appropriate to receive the head of the fastener. Such a technique to attach a connecting block to a refrigeration component is also well known, and will not be discussed further.

A U-shaped recess, indicated generally at 44, is formed at the other side of the body and extends axially through the body from one side surface to the other. The U-shaped recess includes a mouth at the opening to the recess comprised of opposing flat surfaces 46, 47. Surface 46, 47 are spaced-apart essentially the width of the recess. The recess also includes a curved inner end 48. A relatively thin and shallow U-shaped channel 50 circumscribes the entire inner surface of the recess, and opens inwardly from the recess. The channel 50 extends substantially parallel to the upper and lower surfaces 20, 22 of the body, at a location close to the surface 22 (that is, at a location closer to surface 22 than surface 20). The channel has opposing sides 52, 53 that face inwardly toward one another at the mouth of the recess, and entrance openings 54, 54, respectively, at the outer ends of the channel 50.

A partial counterbore 56 is formed into recess 44 at the end surface 20. Counterbore 56 is designed to receive an annular flange or bead 58 (FIGS. 1, 2) on the tube to facilitate attaching the tube to the connector block.

Figure 5:
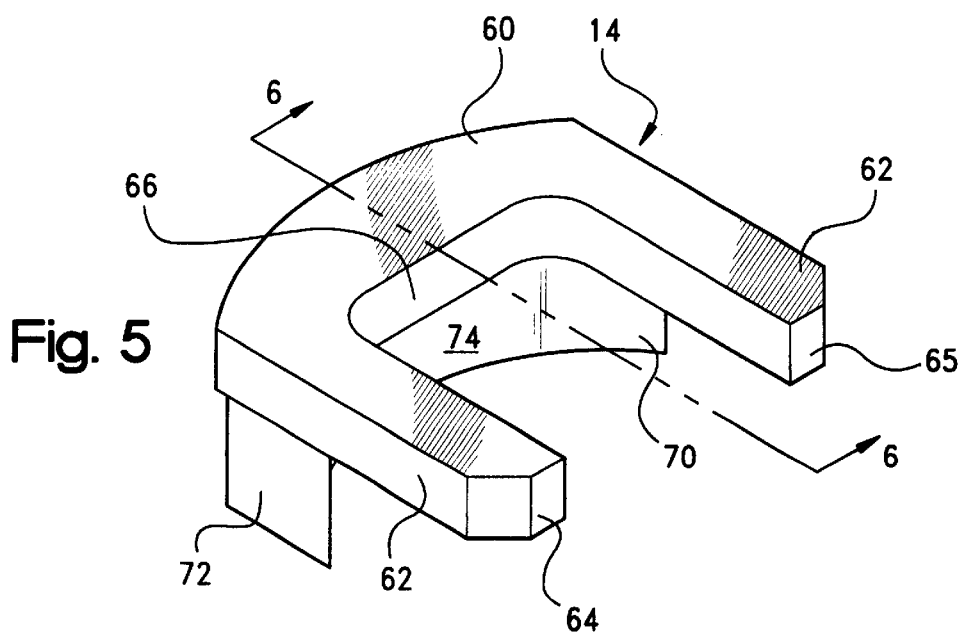
FIG. 5 is an elevated perspective view of the clip for the mounting device.
Figure 6:
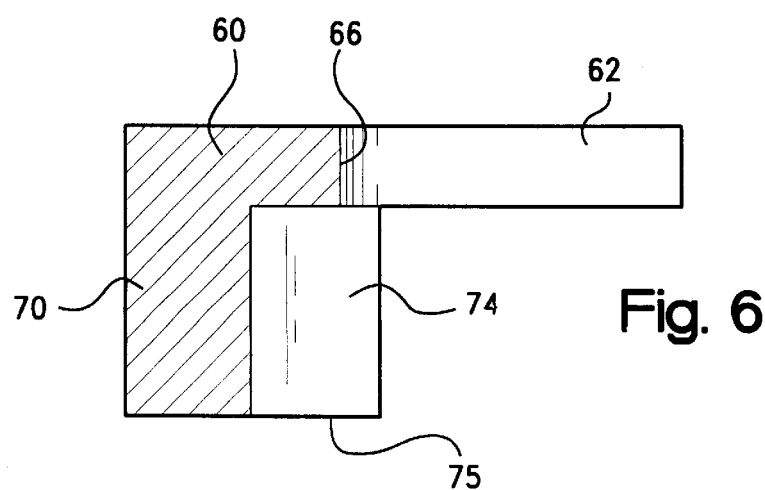
FIG. 6 is a cross-sectional side view of the clip taken substantially along the plane described by the lines 6—6 in FIG. 5.
Figure 7:
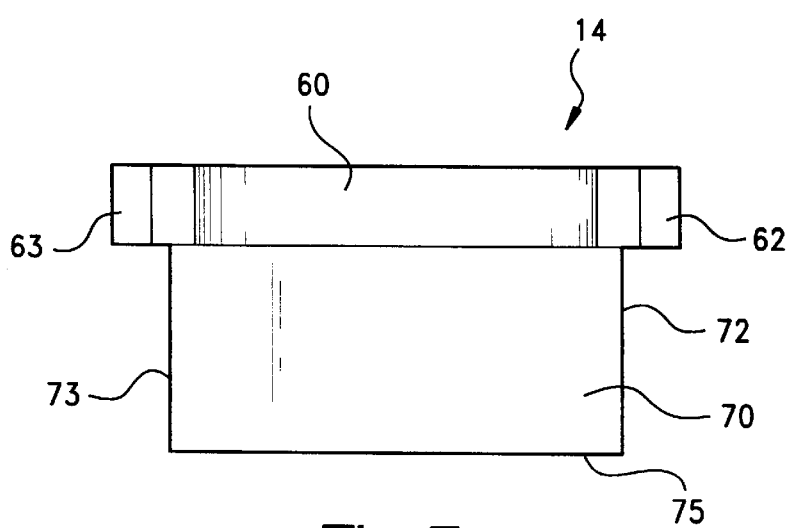
FIG. 7 is a rear end view of the clip.

Referring now to FIGS. 5–7, the clip 14 has a flat U-shaped body 60 including a pair of tabs or fingers 62, projecting outwardly from one side of body 60 in parallel relation to one another. Tabs 62 are dimensioned to be closely received, preferably with a slip-fit, within U-shaped channel 50 in recess 44. Tabs 62 and channel 50 are each illustrated as having complimentary, essentially square (in cross section) flat surfaces, however these components could have other geometries as well that would closely match each other. The distal ends 65 of the tabs 62 are preferably tapered so as to be easily received in the ends 52, 53 of the U-shaped channel 50. The tabs 62 preferably have a length which causes the tabs to bear against the curved inner end 48 (see FIG. 8) of recess 50 and bend slightly inwardly toward each other as the clip is fully inserted into the channel to facilitate retaining the clip within the block.

The inner end of the U-shaped body defines a flat flange or shoulder 66 extending essentially perpendicular to the tabs 62. The flange 66 faces inwardly into U-shaped recess when the clip is assembled with the block. Flange 60 is designed to engage one of a series of notches or grooves 67 in tube 16 to rotationally fix the tube within the block.

An extension 70 projects outwardly from one end of body 60. Extension 70 includes a pair of flat side surfaces 72, 73, and has a width which closely, and preferably tightly, fits between the side surfaces 46, 47 (FIG. 4) of recess 50 such that the clip is frictionally held in the recess. The extension has a concave front surface 74 with a dimension substantially matching the outer diameter of the tube to be connected. The extension further has a flat lower surface or edge 75. As shown particularly in FIGS. 6 and 7, the body 60 of the clip overhangs the sides and front of the extension 70. The rear of the body and extension preferably extend flush with each other.

Referring again to FIG. 2, the tube 16 is initially inserted into recess 44, preferably by inserting the tube in the direction "B", essentially perpendicular to the axis "A". It is noted that the tube could alternatively be inserted axially into the recess 44. In any case, the tube is located such that bead 58 fits within counterbore 56. This facilitates axially locating the tube with respect to the block.

Figure 8:
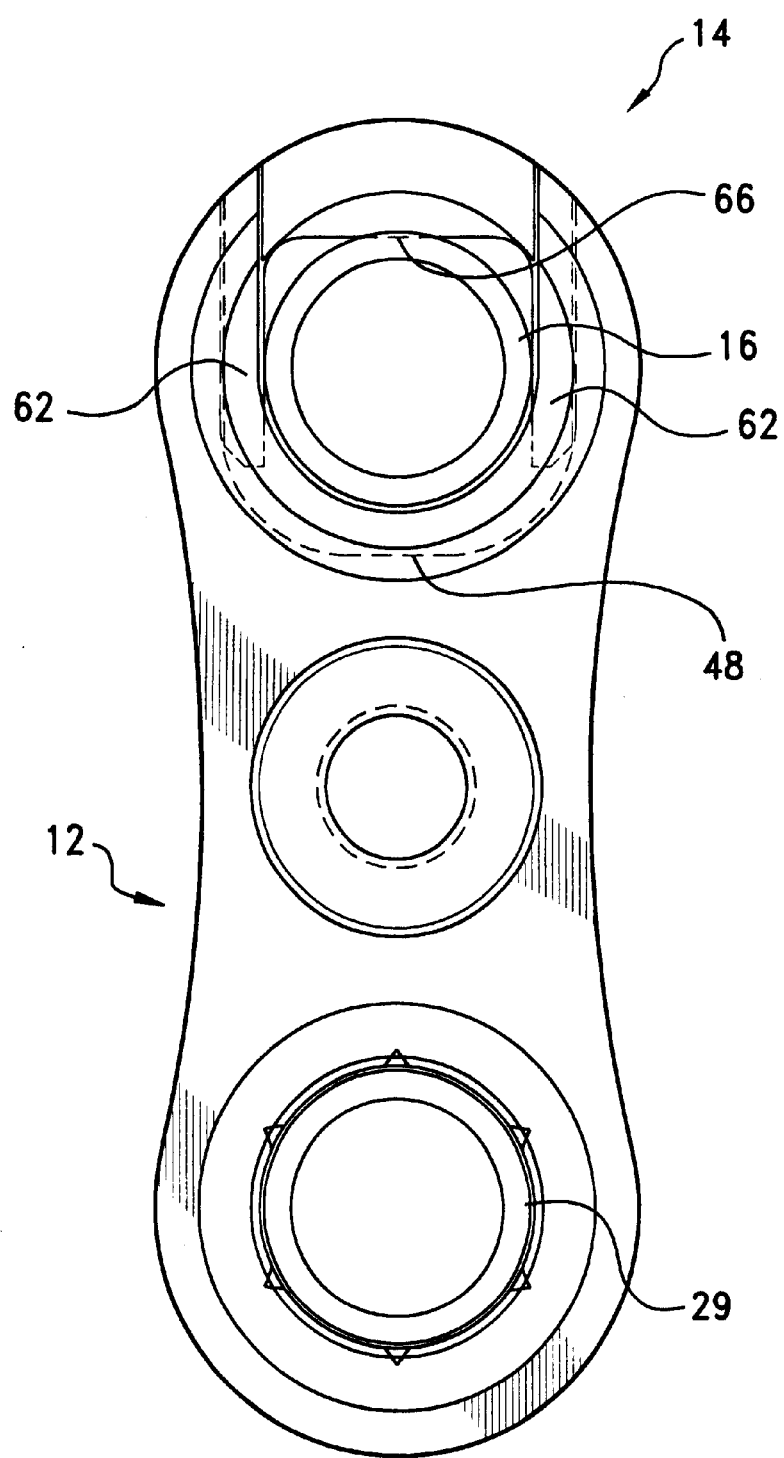
FIG. 8 is a top view of the mounting device of FIG. 1, showing portions in phantom.

Next, clip 14 is inserted in the direction "B" into the connecting block. The tabs 62 of the clip are received in the ends 54, 55 of the U-shaped channel 50, and the clip is inserted until the tabs bear against the curved inner end 48 of the channel, and the side surfaces 72, 73 of the clip body are tightly received between the side surfaces 46, 47 of the recess. When fully inserted as shown in FIG. 8, the flange 66 of the clip enters one of the notches 67 on the tube to rotationally fix the tube with respect to the connecting block. The tabs 62 also have a slightly smaller inner dimension than the channel 50, such that the tabs engage and bear against the outer diameter of the tube 16. As the clip is fully inserted, the distal end 75 of the extension contacts the bead 58 on the tube which urges the tube outwardly somewhat from the block and creates a tight fit between the clip and the tube, by virtue of the engagement of flange 66 and notches 67. All these features facilitate holding the tube within the connection block, and control the amount of rotation of the tube depending upon the amount of insertion of the clip into the channel.

After the clip is fully inserted, the outer ends 54, 55 of the channel 50 can then be mechanically deformed, such as by coining the body (see, e.g., FIG. 1) to capture the tabs 62 within the channel 50 and securely, and preferably permanently, fix the clip 14 to body 18.

The connecting block 12 and clip 14 can be formed of any material appropriate for the particular application. Typically the connecting block is formed from a rigid, lightweight, easily-machinable material, such as aluminum; while the clip is formed from a resilient material such as reinforced Nylon. While the above description and illustration is directed toward a connecting block where one tube is attached in a conventional manner (inserted axially through a bore), and a second tube is attached in the inventive manner (received in the U-shaped recess), it is possible that the block could include only one (or more) tubes attached using the inventive manner. In this case, the structure of the connecting block (e.g., the U-shaped recess, the U-shaped channel, the clip) would be replicated across the block as necessary.

As such, the present invention provides an improved mounting device for mounting a tube to a component of a refrigeration system. The mounting device includes a connecting block and a tube, which allows selective control of the rotation of the tube captured in the block; is simple in construction and assembly, and relatively inexpensive to manufacture; and does not rely on a spring function or system pressure to maintain the attachment of the tube.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A connecting block apparatus for a pair of tubes, the connecting block apparatus comprising:
   an elongated body having first and second end surfaces a first circular opening interconnecting the surfaces along an axis of the body toward one side of the body for receipt of a first of the tubes; a second circular opening axially interconnecting the surfaces in the central portion of the body for receipt of an attachment device; and a U-shaped recess axially interconnecting the surfaces toward an other side of the body for receipt of a second of the tubes, the U-shaped recess opening outwardly from the other side of the body for receipt of a second of the tubes, and including a U-shaped channel formed in the recess perpendicular to the axis of the body and facing outwardly from the recess; and
   a clip adapted to be received in the U-shaped recess by inserting the clip into the U-shaped channel substantially perpendicular to the axis of the body to retain the second tube in the body, the clip including a body comprising a pair of parallel tabs and a pair of flat side surfaces projecting normal to the tabs and extending away from the U-shaped channel, the flat side surfaces closely fitting within the U-shaped recess such that the clip is tightly held in the recess.

2. The connecting block apparatus as in claim 1, wherein the clip has a U-shape and the pair of tools being spaced apart from one another and closely received in opposite sides of the U-shaped channel to retain the clip within the body.

3. The connecting block apparatus as in claim 2, wherein the tabs are spaced parallel to each other.

4. The connecting block apparatus as in claim 3, wherein the tabs and the channel have a length such that when the clip is inserted into the U-shaped channel, the tabs are bent inwardly toward one another by a curved inner end of the channel to facilitate retaining the clip within the channel.

5. The connecting block apparatus as in claim 4, wherein the U-shaped channel circumscribes the entire U-shaped recess.

6. The connecting block apparatus as in claim 2, wherein the channel is mechanically deformed so as to retain the tabs within the channel.

7. The connecting block apparatus as in claim 1, wherein the clip has a U-shaped body, and the pair of tools extend outwardly from the clip body in parallel relation to one another, the tabs received in opposite sides of the U-shaped channel to retain the clip within the elongated body, an outwardly-projecting flange perpendicular to the tabs and facing the U-shaped channel when the clip is inserted in the channel, the flange designed to cooperate with the second tube to rotationally orient the second tube in the elongated body.

8. The connecting block apparatus as in claim 1, wherein the extension including a concave curved portion facing the U-shaped channel when the clip is inserted in the channel.

9. The connecting block apparatus as in claim 8, wherein the extension has a peripheral dimension that is tightly received within the open mouth of the U-shaped recess.

10. The connecting block apparatus as in claim 1, wherein the clip is resilient.

11. The connecting block apparatus as in claim 1, wherein the U-shaped recess includes a partial counterbore along the first surface of the body, and the U-shaped channel is formed toward the second surface of the body.

12. Connecting block apparatus as in claim 1, wherein the first and second surfaces are parallel to one another.

13. The connecting block apparatus as in claim 1, wherein the clip is closely received in the U-shaped recess and frictionally held in die U-shaped recess.

14. A connecting block apparatus, comprising:
- a body having first and second end surfaces extending generally in parallel relation to one another and perpendicular to an axis of the body, and a side surface extending around die periphery of the body and interconnecting the end surfaces, a first opening axially interconnecting the end surfaces for receipt of a first tube, a U-shaped recess axially interconnecting die end surfaces and opening to the side surface of the body generally perpendicular to the end surfaces for receipt of a second tube, the U-shaped recess including a U-shaped channel circumscribing the recess perpendicular to the axis and facing outwardly from the recess toward the side surface; and
- a resilient clip closely received in the U-shaped recess by inserting the clip into the U-shaped channel substantially perpendicular to the axis of die body to retain the second tube in the body, the clip including a body comprising a pair of parallel tabs and a repair of flat side surface projecting normal to the tabs and extending away from the U-shaped channel, the flat side surfaces closely fitting within the U-shaped recess such that the clip is tightly held in the recess.

15. The connecting block apparatus as in claim 14, wherein the clip has a U-shape and the pair of tabs being, spaced apart front one another and closely received in opposite sides of the U-shaped channel to retain the clip within the body.

16. The connecting block apparatus as in claim 15, wherein the tabs and the channel have a length such that the tabs are bent inwardly toward one another by a curved inner end of the channel to facilitate retaining the clip within the channel.

17. The connecting block apparatus as in claim 15, wherein the channel is mechanically deformed so as to retain the tabs within the channel.

18. The connecting block apparatus as in claim 14, wherein the clip has a U-shaped body, and the pair extend outwardly from the clip body in parallel relation to one another, the tabs received in opposite sides of the U-shaped channel to retain the clip within the body, an outwardly-projecting flange perpendicular to the tabs and facing the U-shaped channel, the flange designed to cooperate with the tube to rotationally orient the second tube in the body.

19. The connecting block apparatus as in claim 14, wherein the extension includes a concave curved portion facing the U-shaped channel, the extension having a peripheral dimension tightly received within die opening of the U-shaped recess.

20. A method for assembling a connecting block apparatus with a pair of tubes, comprising the steps of:
- providing a connecting block apparatus with a body having first and second end surfaces extending generally in parallel relation to one another and perpendicular to an axis of the body, and a side surface extending around the periphery of the body and interconnecting the end surfaces, a first opening axially interconnecting the end surfaces for receipt of a first tube, and a U-shaped recess axially interconnecting the end surfaces and opening to the side surface of the body generally perpendicular to the end surfaces for receipt of a second tube, the U-shaped recess including a U-shaped channel circumscribing the recess perpendicular to the axis and facing outwardly from die recess toward the side surface, and
- a resilient U-shaped clip, the clip including a body comprising a pair of parallel tabs and a pair of flat side surfaces projecting normal to the tabs and extending away from the U-shaped channel, the flat side surfaces closely fitting within the U-shaped recess; and
- inserting the first tube into the first opening; and inserting the second tube into the recess in a direction substantially perpendicular to the axis of the body, and
- inserting the clip into the U-shaped channel in a direction substantially perpendicular to the axis of the body, such that the flat side surfaces tightly retain the clip in the recess.

21. The method as in claim 20, wherein the clip includes a pair of projecting tabs, and the step of inserting the clip into the channel comprises inserting the tabs of the clip into opposite sides of the U-shaped channel.

22. The method as in claim 21, and further including the step of mechanically deforming the channels so as to retain the tabs within the channel.

23. An assembly comprising a connecting block, a U-shaped clip, a first tube held in a first opening in the connecting block, and a second tube held in a U-shaped recess in the connecting block by the clip, the connecting block including a body having first and second end surfaces extending generally in parallel relation to one another and perpendicular to an axis of the body, and a side surface extending around the periphery of the body and interconnecting the end surfaces, a U-shaped recess axially interconnecting the end surfaces and opening to the side surface of the body generally perpendicular to the end surfaces and receiving the second tube, the U-shaped recess including a U-shaped channel circumscribing the recess perpendicular to the axis and facing outwardly from the recess toward the side surface; and the clip closely received hi the U-shaped recess by inserting the clip into the U-shaped channel substantially perpendicular to the axis of the body, the clip engaging the second tube and retaining the second tube in the connecting block, the clip further including a body comprising a pair of parallel tabs and a pair of flat side surfaces projecting normal to the tabs and extending away from the U-shaped channel, the flat side surfaces closely fitting within the U-shaped recess such that the clip is tightly held in the recess.

24. The assembly as in claim 23, wherein the second tube includes a geometry which cooperates with a geometry on the clip to prevent the second tube from rotating with respect to the block when the clip and second tube are assembled.

25. The assembly as in claim 24, wherein the geometry on the second tube includes a notch in the second tube, and the geometry on the clip includes an outwardly-projecting flange perpendicular to tabs on the clip and facing the U-shaped channel, the flange engages with the notch on the second tube to rotationally orient the second tube in the body.

26. The assembly as in claim 24, wherein the geometry on the clip and the geometry on the second tube also cooperate to locate the second tube axially with respect to the block.

27. The assembly as in claim 26, wherein the geometry on the second tube further includes an annular bead, and the geometry on the clip further includes a distal edge, the edge engaging the bead to axially fix the second tube with respect to the body.

28. The assembly as in claim 23, wherein the pair of parallel tubes being, spaced apart from one another and closely received in opposite sides of the U-shaped channel to retain the clip within the body.

29. The assembly as in claim 28, wherein the labs have a length such that the tabs are bent inwardly toward one another by a curved inner end of the channel to retain the clip within the channel.

30. The assembly as in claim 28, wherein the channel is mechanically deformed so as to retain the tabs within the channel.

31. The assembly as in claim 23, wherein the extension includes a concave curved portion facing the U-shaped channel, the extension having a peripheral dimension tightly received within the opening of the U-shaped recess.

\* \* \* \* \*